US011639693B2

(12) United States Patent
Nethercutt et al.

(10) Patent No.: US 11,639,693 B2
(45) Date of Patent: May 2, 2023

(54) INTERNAL COMBUSTION ENGINE AND METHOD TO INCREASE THE TEMPERATURE OF A LIQUID IN THE INTERNAL COMBUSTION ENGINE

(71) Applicant: Cummins Inc., Columbus, IN (US)

(72) Inventors: Jeremiah C. Nethercutt, Columbus, IN (US); Emrah Arslanturk, Columbus, IN (US); Weiwen Wang, Columbus, IN (US); James A. Cramer, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 1036 days.

(21) Appl. No.: 16/338,312

(22) PCT Filed: Sep. 30, 2016

(86) PCT No.: PCT/US2016/054604
§ 371 (c)(1),
(2) Date: Mar. 29, 2019

(87) PCT Pub. No.: WO2018/063267
PCT Pub. Date: Apr. 5, 2018

(65) Prior Publication Data
US 2020/0025119 A1    Jan. 23, 2020

(51) Int. Cl.
F02D 41/02    (2006.01)
F01N 3/20     (2006.01)
(Continued)

(52) U.S. Cl.
CPC ....... F02D 41/0255 (2013.01); F01N 3/2013 (2013.01); F01P 3/20 (2013.01);
(Continued)

(58) Field of Classification Search
CPC ............... F02D 41/0255; F02D 41/144; F02D 41/1441; F02D 41/1448; F01N 3/2013; F02B 37/22; G05D 23/1917
(Continued)

(56) References Cited

U.S. PATENT DOCUMENTS 5,645,745 A    7/1997  Hartwick et al.
6,109,235 A *  8/2000  Hoshiba ............... F02B 61/045
                                            123/406.55

(Continued)

FOREIGN PATENT DOCUMENTS

DE    10006533 A1 * 10/2001 ............ F01M 11/10
EP    1178197 A2    2/2002
(Continued)

OTHER PUBLICATIONS

European Search Report and Search Opinion Received for EP Application No. 16917969.4, dated Sep. 24, 2019, 7 pages.
(Continued)

Primary Examiner — Mahmoud Gimie
(74) Attorney, Agent, or Firm — Faegre Drinker Biddle & Reath LLP

(57) ABSTRACT

A method, controller, and internal combustion engine including the controller and operable in accordance with the method by: determining a temperature of a working liquid in an engine block circuit (31, 35) of the internal combustion engine (10), the working liquid comprising a cooling liquid or a lubrication liquid; operating the internal combustion engine (10); engaging a thermal load responsive to the temperature of the liquid being below a first temperature threshold, wherein engaging the thermal load comprises at least one of increasing a pumping load of the internal combustion engine (10), or changing an air/fuel ratio, thereby adding heat to the engine block circuit (31, 35);
(Continued)

controlling the thermal load as a function of the temperature of the liquid; and disengaging at least a portion of the thermal load responsive to the temperature of the liquid being above the low temperature limit.

19 Claims, 5 Drawing Sheets

(51) Int. Cl.
*F01P 3/20* (2006.01)
*F02B 37/22* (2006.01)
*F02D 13/02* (2006.01)
*F02D 41/14* (2006.01)
*G05D 23/19* (2006.01)
*G05B 15/02* (2006.01)

(52) U.S. Cl.
CPC .......... *F02B 37/22* (2013.01); *F02D 13/0242* (2013.01); *F02D 41/144* (2013.01); *F02D 41/1441* (2013.01); *F02D 41/1448* (2013.01); *G05D 23/1917* (2013.01); *F01P 2070/04* (2013.01); *F02D 2041/026* (2013.01); *F02D 2200/023* (2013.01); *F02D 2200/0406* (2013.01); *F02D 2250/24* (2013.01); *F02D 2250/34* (2013.01); *G05B 15/02* (2013.01)

(58) Field of Classification Search
USPC ....................................................... 701/103
See application file for complete search history.

(56) References Cited

U.S. PATENT DOCUMENTS

| | | | |
|---|---|---|---|
| 6,418,713 B1 | 7/2002 | Gale et al. | |
| 6,931,849 B2 | 8/2005 | Parker | |
| 7,007,460 B2 | 3/2006 | Frieden et al. | |
| 7,076,945 B2 | 7/2006 | Sisken et al. | |
| 7,200,995 B2 | 4/2007 | Schroeder et al. | |
| 7,207,176 B2 | 4/2007 | Mulloy et al. | |
| 7,261,086 B2 | 8/2007 | Nuang | |
| 7,658,068 B2 | 2/2010 | Mulloy et al. | |
| 8,042,326 B2 | 10/2011 | Farell et al. | |
| 8,156,730 B2 | 4/2012 | Guo et al. | |
| 8,356,471 B2 | 1/2013 | Chi et al. | |
| 8,565,932 B2 | 10/2013 | Oakes | |
| 2001/0011455 A1 | 8/2001 | Harima et al. | |
| 2001/0018632 A1* | 8/2001 | Thomas | F02D 41/064 701/115 |
| 2002/0073696 A1 | 6/2002 | Kuenstler et al. | |
| 2009/0288398 A1* | 11/2009 | Perfetto | F02D 41/0007 60/287 |
| 2009/0293453 A1* | 12/2009 | Sujan | F01N 3/035 60/285 |
| 2009/0299600 A1* | 12/2009 | Guo | F02D 41/1497 701/102 |
| 2010/0043428 A1 | 2/2010 | Stablein et al. | |
| 2010/0065376 A1* | 3/2010 | Pursifull | F01M 5/021 184/6.22 |
| 2013/0060454 A1 | 3/2013 | Yacoub | |
| 2013/0125853 A1* | 5/2013 | Pursifull | B60H 1/22 123/196 AB |
| 2013/0184970 A1 | 7/2013 | Kanafani | |
| 2013/0206744 A1* | 8/2013 | King | F02N 19/10 219/208 |
| 2014/0144997 A1 | 5/2014 | Eisenhour et al. | |
| 2014/0196454 A1 | 7/2014 | Ulrey et al. | |
| 2015/0000630 A1 | 1/2015 | Coldren | |
| 2015/0114339 A1* | 4/2015 | Sellnau | F02B 29/0412 123/294 |
| 2015/0135680 A1* | 5/2015 | Ancimer | F02D 17/00 60/274 |

FOREIGN PATENT DOCUMENTS

| | | | | |
|---|---|---|---|---|
| EP | 1250523 A1 | | 10/2002 | |
| EP | 1298301 A1 | | 4/2003 | |
| JP | 05-163978 A | | 6/1993 | |
| JP | 2009184641 A | * | 8/2009 | |
| JP | 5868073 B2 | * | 2/2016 | |
| WO | 01/55575 A1 | | 8/2001 | |
| WO | WO-2014110130 A1 | * | 7/2014 | ............ F02B 75/22 |

OTHER PUBLICATIONS

International Preliminary Reporton Patentability received for PCT Patent Application No. PCT/US2016/054604, dated Apr. 11, 2019, 9 pages.

International Search Report and Written Opinion issued by the ISA/US, Commissioner for Patents, dated Jan. 19, 2017, for International Application No. PCT/US2016/054604; 9 pages.

* cited by examiner

INTERNAL COMBUSTION ENGINE AND METHOD TO INCREASE THE TEMPERATURE OF A LIQUID IN THE INTERNAL COMBUSTION ENGINE

RELATED APPLICATIONS

This application is a National Stage entry under 35 U.S.C. 371 of International Application No. PCT/US2016/054604, filed Sep. 30, 2016, the disclosure of which is incorporated herein by reference in its entirety.

FIELD OF THE DISCLOSURE

The present disclosure generally relates to controlling the temperature of an internal combustion engine, and more particularly to controlling the temperature of a liquid circulating through the internal combustion engine.

BACKGROUND OF THE DISCLOSURE

Internal combustion engines are designed to operate within a desirable temperature range. Coolant liquid absorbs heat if the engine is hot and rejects the heat to air flowing through a radiator. If the engine is cold, the engine may be idled to warm the engine. In a vehicle powered by the combustion engine, the idle speed may be increased only while the vehicle is parked.

Internal combustion engines in hybrid vehicles require more time to increase their temperature from cold conditions to normal operating conditions. During this longer time more raw hydrocarbons are released to the exhaust system, potentially fouling exhaust after-treatment components. Thus, operation of the engine during the warming period can lead to component failures.

Improved internal combustion engines and methods of operating internal combustion engines are needed to increase reliability and fuel efficiency.

The background of the disclosure is described herein to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY OF THE DISCLOSURE

A method, controller, and internal combustion engine including the controller and operable in accordance with the method are described. In various embodiments, the method comprises: determining a temperature of a working liquid in an engine block circuit of the internal combustion engine, the working liquid comprising a cooling liquid or a lubrication liquid; operating the internal combustion engine; engaging a thermal load responsive to the temperature of the liquid being below a first temperature threshold; controlling the thermal load as a function of the temperature of the liquid; and disengaging at least a portion of the thermal load responsive to the temperature of the liquid being above the low temperature limit.

In some variations of the present embodiment, engaging the thermal load comprises at least one of increasing a pumping load of the internal combustion engine, or changing an air/fuel ratio, thereby adding heat to the engine block circuit.

Various embodiments comprise a controller comprising thermal control logic structured to implement the method described in the preceding paragraphs.

Various embodiments comprise an internal combustion engine comprising the controller described in the preceding paragraph.

In additional embodiments, the internal combustion engine comprises: an engine block including an engine block circuit to circulate a liquid therethrough, the engine block circuit comprising a cooling circuit or a lubrication circuit; a temperature sensor structured to sense a temperature of the liquid; and an engine controller comprising thermal control logic structured to implement a method including: operating the internal combustion engine; engaging a thermal load responsive to the temperature of the liquid being below a first temperature threshold, wherein engaging the thermal load comprises at least one of increasing a pumping load of the internal combustion engine, or changing an air/fuel ratio, thereby adding heat to the engine block circuit; controlling the thermal load as a function of the temperature of the liquid; and disengaging at least a portion of the thermal load responsive to the temperature of the liquid being above the low temperature limit.

There has thus been outlined, rather broadly, various features of the invention so that the detailed description thereof that follows may be better understood, and so that the present contribution to the art may be better appreciated. Other features of the present invention will become clearer from the following detailed description taken with the accompanying claims.

BRIEF DESCRIPTION OF THE FIGURES

The following detailed description of embodiments of the invention will be better understood when read in conjunction with the appended drawings. It should be understood, however, that the invention is not limited to the precise arrangements and instrumentalities of the embodiments shown in the drawings.

Figure 1:
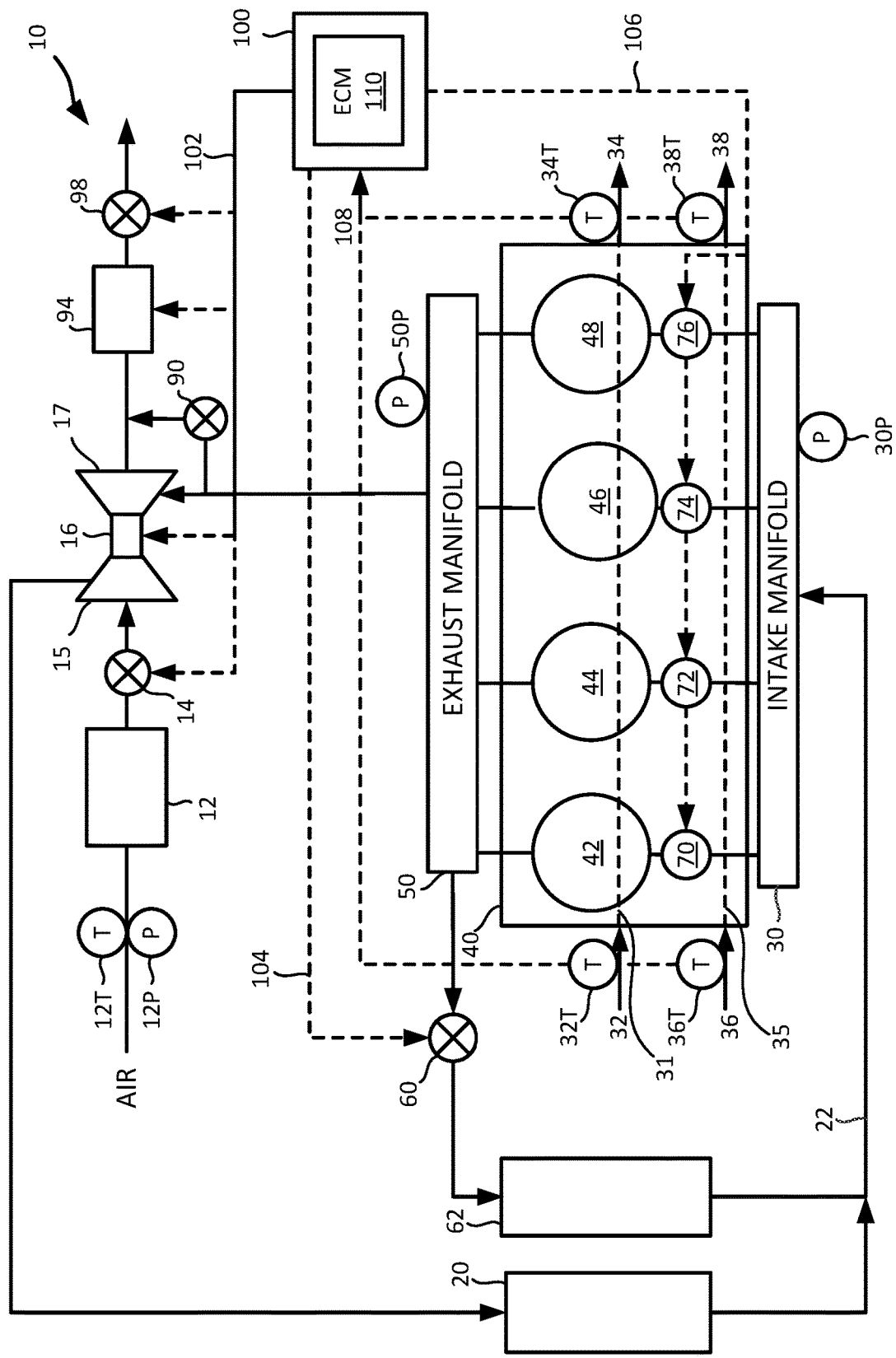
FIG. 1 is a block diagram of an embodiment of an internal combustion engine.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein are not to be construed as limiting the scope of the invention in any manner.

DETAILED DESCRIPTION

The embodiments disclosed below are not intended to be exhaustive or to limit the disclosure to the precise forms disclosed in the following detailed description. Rather, the embodiments are chosen and described so that others skilled in the art may utilize their teachings.

Except where a contrary intent is expressly stated, the following terms have the following meanings:

"About" as used herein when referring to a measurable value such as an amount, a temporal duration, and the like, is meant to encompass the exact numerical value as though it had been recited without the term "about".

"Comprises," "comprising," "containing," and "having" and the like mean includes," "including," and the like, are open ended terms.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

Generally, operation of the internal combustion engine is controlled in part based on the temperature of a liquid circulating through the internal combustion engine. When the temperature is below a low temperature limit, resulting in undesirable hydrocarbon production, a controller of the internal combustion engine engages a thermal control strategy to raise the temperature of the liquid. The thermal control strategy can be mildly aggressive or aggressive, depending on the value of the temperature. The thermal control strategy may intentionally decrease fuel efficiency to increase the pumping load of the internal combustion engine. Of course decreased fuel efficiency is undesirable. The thermal control strategy may additionally or alternatively engage parasitic loads to increase the pumping load. While parasitic loads also increase fuel consumption, the thermal control strategy may engage parasitic loads that would be engaged at a later time, therefore the related fuel consumption does not result in a net fuel increase.

Various thermal control tactics may be employed jointly to achieve synergistic effects. Another advantage of the disclosed strategies and tactics is an improved level of control vis a vis control based on exhaust gases or other indirect measures.

Referring now to FIG. 1, a block diagram of an embodiment of a combustion engine 10 is shown. Combustion engine 10 comprises an air filter 12, an air input throttle 14 upstream of an air-compressor 16, an after-treatment system 94, and an exhaust throttle 98. Air charged by air-compressor 16 is cooled in an air-charge cooler 20. Exhaust gases drive air-compressor 16 as described further below and are treated in after-treatment system 94 before being discharged to the environment. A waste-gate 90 is provided to divert exhaust gases away from turbocharger 16. A portion of the exhaust gases may be cooled in an exhaust gas recirculation (EGR) cooler 62 before being recirculated. The controller may transmit control signals 102 to actuate air input throttle 14, air-compressor 16, after-treatment system 94, and exhaust throttle 98. Air filter sensors 12T and 12P sense, respectively, the temperature and pressure of the air entering air filter 12.

Engine 10 further includes an intake manifold 30, a block 40, and an exhaust manifold 50. Cooled gases discharged from EGR cooler 62 and fresh gases discharged from air-charge cooler 20 are supplied to intake manifold 30 via a conduit 22. Exhaust gases may be discharged from exhaust manifold 50 to an EGR valve 60 or to a turbine 17 of air-compressor 16 to drive air-compressor 16. Engine 10 also includes engine block circuits 31 and 35. Engine block circuit 31 is a coolant circuit in block 40 and is fluidly coupled to a coolant pump (not shown) configured to circulate coolant liquid into block 40 through an inlet port 32, out of block 40 through an outlet port 34, and through a radiator (not shown), as is well known in the art, to extract heat from block 40 and reject it to air flowing through the radiator. Temperature sensors 32T or 34T sense the temperature of the coolant liquid. Engine block circuit 35 is a lubrication circuit in block 40 (not shown) fluidly coupled to a lubrication pump (not shown) configured to circulate lubricant liquid through the internal combustion engine through an inlet port 36, out of block 40 through an outlet port 38, as is well known in the art, to lubricate components of the internal combustion engine. Temperature sensors 36T or 38T sense the temperature of the lubricant liquid.

In the present embodiment, combustion engine 10 comprises a control subsystem 100 including an engine control module (ECM) or controller 110 configured to control air and fuel flow delivered by fuel injectors 70, 72, 74, and 76 to combustion cylinders 42, 44, 46, and 48, where the fuel mixes and air mixture is ignited. Example fuel injectors 70, 72, 74, and 76 include direct fuel injectors, which inject fuel directly into combustion cylinders 42, 44, 46, and 48, and port injectors, which spray fuel into intake ports fluidly connected to combustion cylinders 42, 44, 46, and 48. Control subsystem 100 activates the fuel injectors via control signals 106. Temperature signals are transmitted over lines 108 providing the temperatures of the liquids to control subsystem 100. While four combustion cylinders are shown, it should be understood that the present disclosure is applicable to engines of different configurations, including more or less cylinders, cylinders arranged in-line or V-configuration, and generally to any internal combustion engine having the components recited in the claims. Control subsystem 100 may include other control modules such as a transmission system control module, an exhaust system control module, a fuel supply system control module, and others.

In certain embodiments, ECM or controller 110 is structured to determine operating conditions of engine 10 based on measured parameters and operating models, and to control engine 10 based on the operating conditions and desired performance. In certain embodiments, controller 110 forms a portion of a control subsystem including one or more computing devices having non-transient computer readable storage media, processors or processing circuits, and communication hardware. The controller may be a single device or a distributed device, and the functions of the controller may be performed by hardware and/or by processing instructions stored on non-transient machine readable storage media. Example processors include an application specific integrated circuit (ASIC), a field programmable gate array (FPGA), a digital signal processor (DSP), and a microprocessor including firmware.

In one aspect of the present disclosure, a controller alters operation of the internal combustion engine by increasing the pumping load, or increasing the air/fuel ratio so as to run lean, or both. In one embodiment, the controller causes adjustment of a variable geometry turbocharger to increase a backpressure, thereby increasing the pumping load. In another embodiment, the controller increases the idle speed of the engine to increase the pumping load. Increasing the idle speed with the increased backpressure achieves a faster, synergistic, heating rate than the heating rate calculated as the sum of the energies added by the increased idle speed and backpressure. In a further embodiment, the controller alters fueling parameters, such as injection quantity and timing, to cause the engine to run lean. In yet another embodiment, the controller engages or increases parasitic loads to increase the pumping load. Exemplary parasitic loads include electrical resistive heaters, an air compressor, a battery charger, and any other electrical device which can optionally be engaged for reasons other than operating the internal combustion engine. In a further embodiment, the controller engages a hydrocarbon desorption mechanism in an exhaust after-treatment system. Hydrocarbon desorption is typically conducted based on a differential pressure threshold of the system. In the present embodiment, hydrocarbon desorption is engaged even before the differential pressure reaches the threshold, so that the energy required for desorption is also used to warm the internal combustion engine during cold conditions to prevent or reduce hydrocarbon production. One or more of the foregoing embodiments may be configured to work in sequence or concurrently with the other embodiments to tailor the rate of temperature increase of the liquid.

The controller monitors the ambient air and the temperature of the liquid and alters the operation of the internal combustion engine to maintain the temperature of the liquid within a temperature range. The controller may be structured to alter the operation of the internal combustion engine at initial engine startup and subsequently if the temperature of the liquid falls outside the range.

The thermal control strategies described above are employed to raise the temperature of the liquid and may be fuel inefficient, therefore they are paused as the temperature of the liquid rises to a normal range. The strategies may be calibrated in accordance with additional information determined by the controller. For example, upon determining that the internal combustion engine status changed from idle to heavy load operation, the controller may ease or pause the thermal control strategies. In other words, the controller may predict a more rapid rise in temperature due to heavy load operation and scale back or pause completely the thermal control strategies to prevent or delay overshooting the normal temperature range.

In certain embodiments, the controller includes one or more modules structured to functionally execute the operations of the controller. The description herein including modules emphasizes the structural independence of certain aspects of the controller, and illustrates one grouping of operations and responsibilities of the controller. Other groupings that execute similar overall operations are understood to be within the scope of the present application. Modules may be implemented in hardware and/or as processing instructions on a non-transient computer readable storage medium. Modules may be distributed across various hardware or computer based components. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an operational amplifier integrated circuit, analog control elements (springs, filters, integrators, adders, dividers, gain elements), and/or digital control elements.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse-width-modulation signal) indicative of the value, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

Referring once again to FIG. 1, the exhaust gases from engine 10 are treated by after-treatment system 94 before they are discharged into the environment. As is known in the art, after-treatment system 94 may include any of a variety of components configured to process the exhaust from engine 10 in a manner that reduces undesirable emissions, including but not limited to oxidation catalysts, selective catalytic reduction (SCR) systems, NOx adsorbers, and particulate traps or filters. EGR valve 60 may be controlled by controller 110 via ECM valve control signals 104. Exhausted gases flow through EGR valve 60 and an EGR cooler 62 before they flow back into intake manifold 30. Thus, EGR valve 60 affects the recirculated gas volume.

Air-compressor 16, also referred to as a turbocharger, includes turbine 17 and a compressor 15. In general, intake air (ambient or fresh air) is provided to compressor 15. Exhaust gases from engine 10 are provided to turbine 17 to cause turbine 17 to rotate, which causes compressor 15 to rotate and increase the pressure and total volume of air provided to intake manifold 30. The volume of exhaust gases provided to turbine 17 controls, at least in part, the speed and compression of compressor 15. In one embodiment of the present disclosure, air-compressor 16 is a variable geometry turbocharger (VGT). A VGT has a bell-shaped operating curve. The VGT operates inefficiently on the tails of the bell curve. The VGT can be variably opened or closed to control its performance. If the VGT is substantially closed, back-pressure is generated which increases the load on the cylinders and thereby increases the temperature of engine 10 and the coolant liquid. If the VGT is substantially fully opened, the VGT generates low compression causing engine 10 to run rich (unless the air/fuel ratio is changed to compensate) which also increases the temperature of engine 10 and the liquid. Thus, the temperature of the liquid can be raised by operating the VGT on the tails of the bell curve. The tails of the bell curve may be reached by running the VGT substantially fully open or substantially fully closed. If the engine is powering the drive train of a vehicle, the temperature of the liquid can be raised by increasing back-pressure while the vehicle is in motion.

In certain embodiments, controller 110 determines a plurality of operating conditions of combustion engine 10 with sensor signals received from a plurality of sensors, or sensor modules, such as pressure, temperature, oxygen, flow, mass, knock, vibration and any other suitable sensors. Pressure and temperature sensors (not shown) may also be provided to sense the pressure and temperatures of charge-air cooler 20 and EGR cooler 62. Also shown are intake and exhaust manifold pressure sensors 30P and 50P.

As used herein, a thermal control curve is a result obtained by execution of thermal control logic. The thermal control logic may execute various tactics, comprising engagement or actuation of various devices. Example devices include resistive heaters, battery chargers, air compressors, variable gate turbochargers, fuel injectors, fuel pumps, and various air and exhaust throttles or valves. These devices consume energy, which load the engine, or affect operation of the engine in a manner that increases its temperature. Thus, control of these devices in an order determined by the thermal control logic increases the temperature of the engine in a desired manner.

Figure 2:
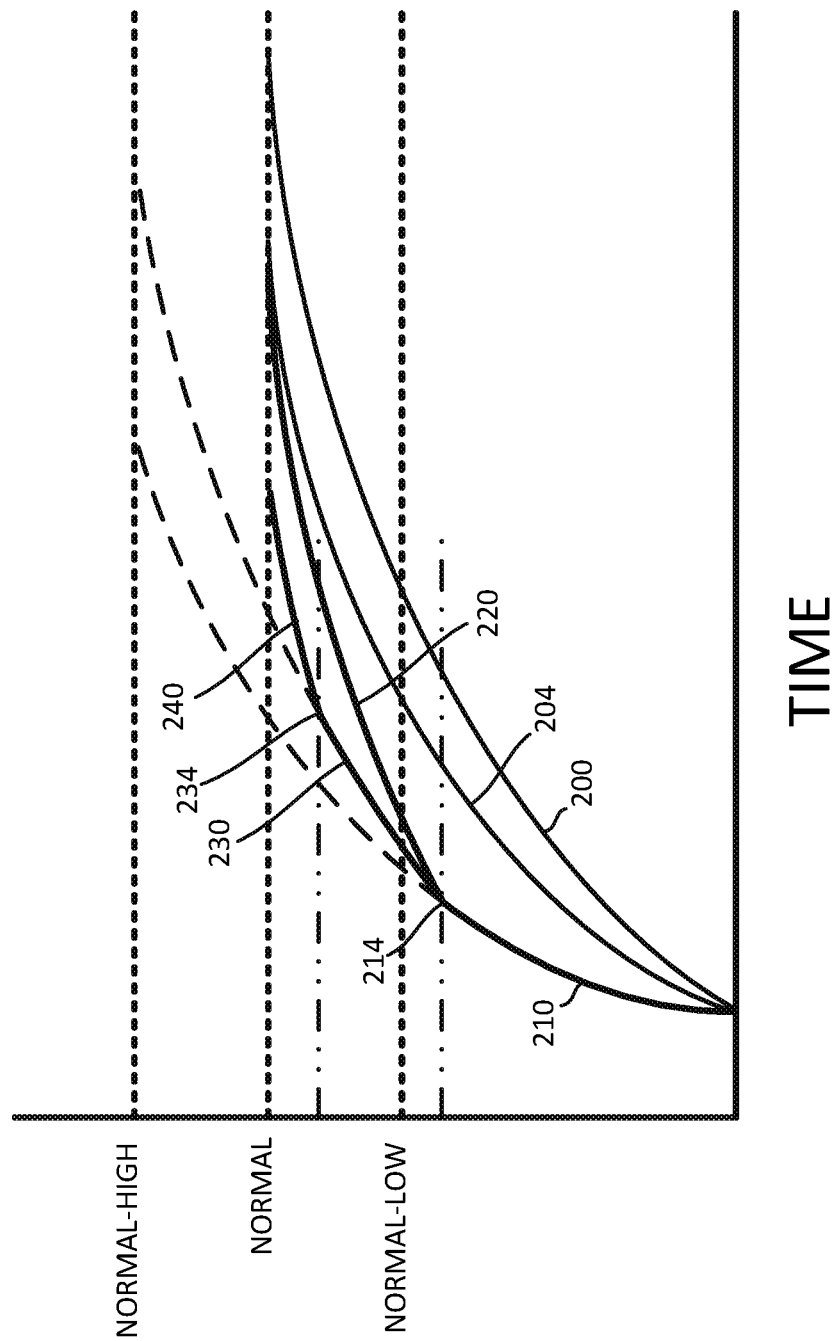
FIG. 2 is a graph depicting different thermal control curves implemented with embodiments of thermal control logic set forth in the disclosure.

FIG. 2 shows a curve 200 representing warming of the liquid under normal operating conditions, such as idling, a first temperature curve 204 resulting from the application of a first thermal control logic, and a second temperature curve 210 resulting from the application of a second thermal control logic which is more aggressive than the first thermal control logic. Also shown is a first temperature threshold 214, at which additional curves 220 and 230 originate. In one variation, the third thermal control logic applies aggressive warming until first temperature threshold 214 is reached, and then applies less aggressive warming according to curves 220 or 230. In another variation, a fourth thermal control logic applies aggressive warming until first temperature threshold 214 is reached, then applies less aggressive warming according to curve 230, and upon reaching a second temperature threshold 234, applies even less aggressive warming according to curve 240, in order to prevent overshooting the normal temperature range. The second, third, and fourth thermal control logic may initially employ a combination of tactics to increase the temperature of the fluid, including both increasing the backpressure and operating with a lean air/fuel mixture, and optionally engaging parasitic loads and increasing the engine idle speed. At temperature threshold 214, the third and fourth thermal control logics may selectively disengage one or more of the engaged tactics, for example by reducing the backpressure to a normal amount, e.g. opening the VGT so that it operates substantially about the peak of the bell curve in a not over-closed condition, while continuing to operate the engine with a lean air/fuel mixture. These thermal control logic are more energy efficient than the second thermal control logic. The first thermal control logic, being less aggressive than the second, may selectively engage one or more tactics, for example to operate the engine with a lean air/fuel mixture or engaging parasitic loads.

It should be understood that while the temperature curves as shown are continuous, discontinuities are permissible. For example, a discontinuity would be apparent if a tactic of the thermal control logic includes hydrocarbon desorption, which discontinuity would appear if desorption is completed before the liquid temperature reaches the normal operating temperature. Discontinuities would also be apparent as parasitic loads are added or removed. The terms "first," "second," "third," and "fourth," are used in this paragraph to distinguish between examples of thermal control logic. The example thermal control logic may be combined in any combination. It is to be understood that the terms "first," "second," "third," and "fourth" are interchangeable.

Figure 3:
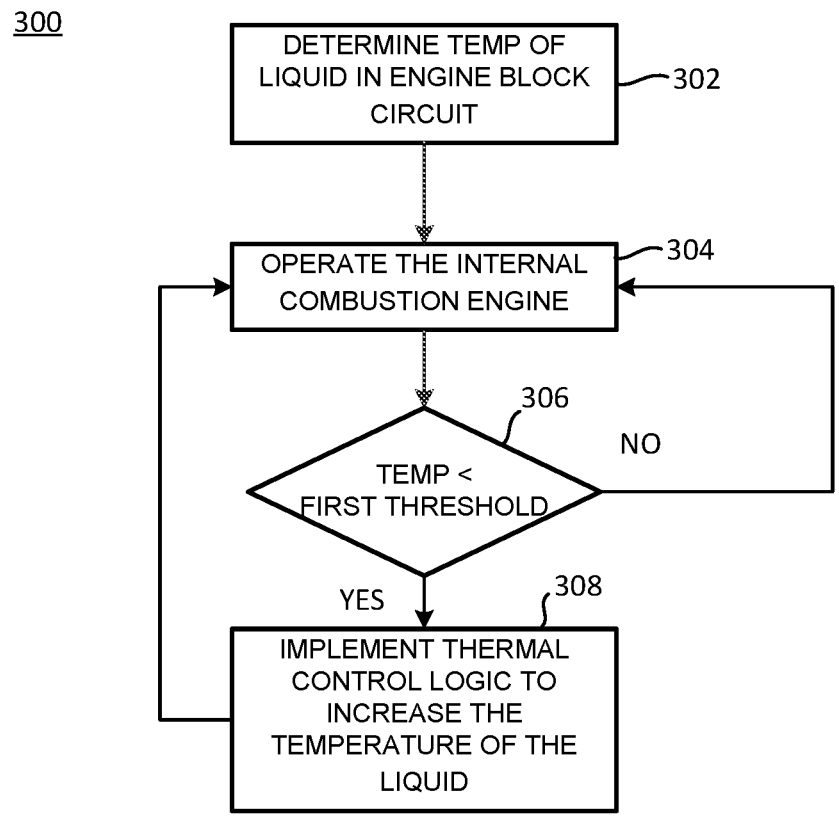
FIG. 3 is a flowchart of an embodiment of a method to control the temperature of a liquid circulating in the internal combustion engine.

FIG. 3 depicts a flowchart 300 of a method of controlling the temperature of a liquid circulating through an internal combustion engine. The method may be implemented by a controller, such as controller 110, in combustion engine 10. The method begins at 302, with determining the temperature of a working liquid in an engine block circuit of the internal combustion engine. The working liquid circulates through the circuit, typically due to operation of a pump in the circuit. Example working liquids include lubrication and coolant liquids.

The method continues at 304, with operating the internal combustion engine. Operating the internal combustion engine includes operating at idle speed with a primary load disengaged, and operating with the primary load engaged. By primary load it is meant a transmission or other mechanism driven by the rotation of the crankshaft of the engine to propel a vehicle or drive a power generator, for example.

The present embodiment of the method continues at 306, with determining if the temperature is below a first temperature threshold. The first temperature threshold may be a temperature below the low limit of a normal temperature range of the engine.

If the temperature is below the first temperature threshold, at 308 the controller executes thermal control logic to increase the temperature of the liquid. The thermal control logic may comprise any one of the first, second, third and fourth thermal control logic described with reference to FIG. 2, and any combination thereof.

In variations of the present embodiment, the controller disengages the thermal control logic upon the temperature of the liquid reaching the first temperature threshold, at which time the engine continues normal operation.

In variations of the present embodiment, the controller disengages the thermal control logic upon the temperature of the liquid rising to about a normal temperature.

In variations of the present embodiment, the controller disengages the thermal control logic upon determining that a rate of increase of the temperature of the liquid exceeds a predetermined rate, the predetermined rate being sufficient to increase the temperature of the liquid in a desired amount of time, and a rate which exceeds the predetermined rate increasing the probability of overheating the engine.

The term "control logic" as used herein includes software and/or firmware executing on one or more programmable processors, application-specific integrated circuits, field-programmable gate arrays, digital signal processors, hard-wired logic, or combinations thereof. For example, in various embodiments controller 110 may comprise or have access to the control logic. Therefore, in accordance with the embodiments, various logic may be implemented in any appropriate fashion and would remain in accordance with the embodiments herein disclosed. A non-transitory machine-readable medium comprising control logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory machine-readable medium, or memory, may include random access memory (RAM), read-only memory (ROM), erasable programmable read-only memory (e.g., EPROM, EEPROM, or Flash memory), electronically programmable ROM (EPROM), magnetic disk storage, and any other medium which can be used to carry or store processing instructions and data structures and which can be accessed by a general purpose or special purpose computer or other processing device.

Figure 4:
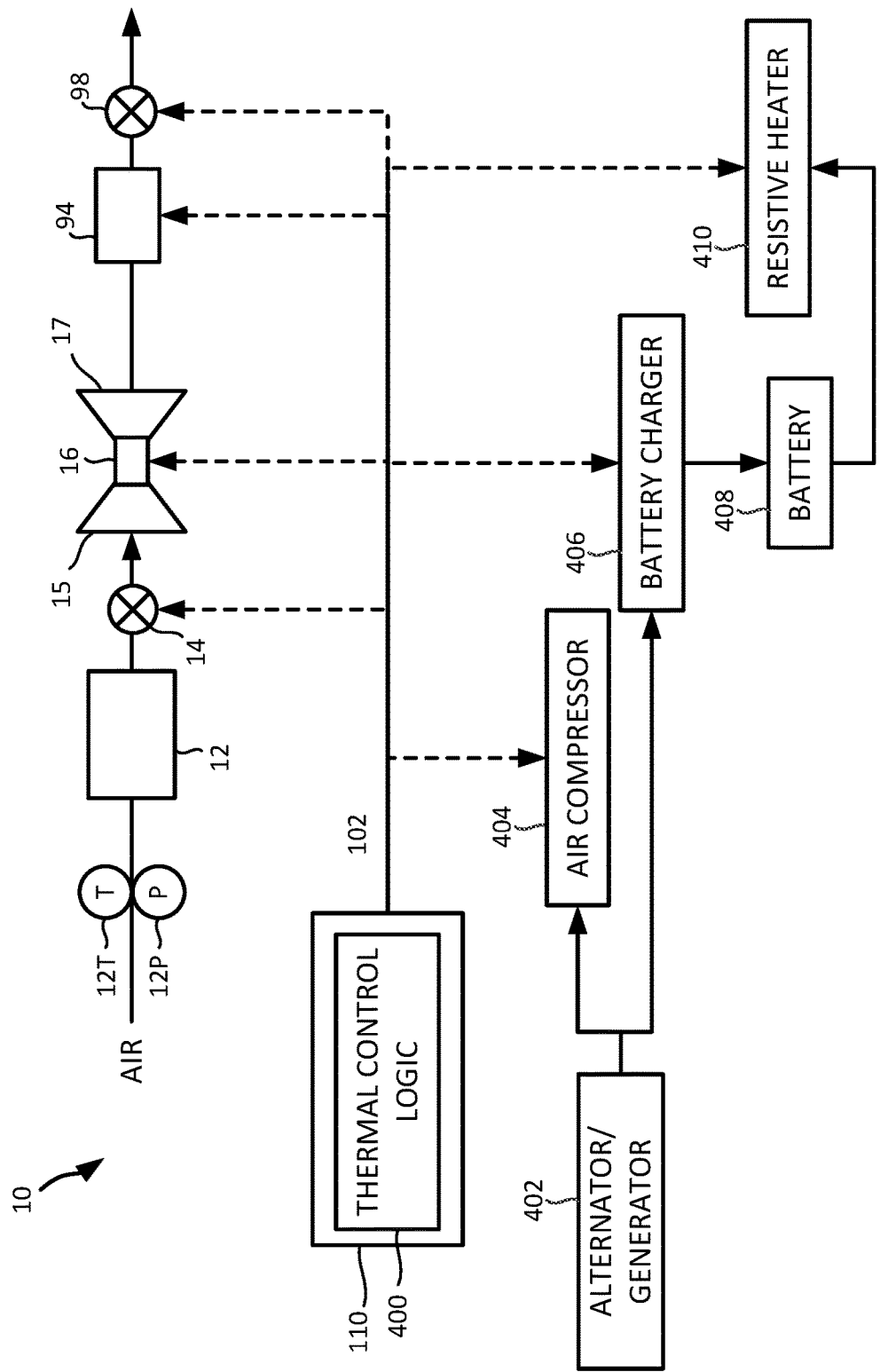
FIG. 4 is a block diagram of an embodiment of parasitic loads of the internal combustion engine.

FIG. 4 is a block diagram depicting examples of parasitic loads of internal combustion engine 10. Therein is shown thermal control logic 400 comprised in or accessible by controller 110 and electrically coupled to various devices engaged by thermal control logic 400 via control signals 102 to a sensor signal interface 430 (shown in FIG. 5), which may comprise a CAN module, in a manner well known in the art. Each device may comprise a CAN module to receive the instructions and an electrical actuator to engage the device. Example electrical actuators include power switches and relays. Devices depicted in FIG. 4 and actuated directly or indirectly via thermal control logic 400 include an alternator/generator 402 to convert mechanical energy to electrical energy, and air compressor 404, a battery charger 406, a battery 408, and a resistive heater 410. Resistive heater 410 is engaged by thermal control logic 400 and draws energy from battery 408, which is charged by battery charger 406, which draws power from alternator/generator 402, which adds a load onto internal combustion engine 10. Thus, at times resistive heater 410 heats the liquid directly, and at times heats the liquid indirectly by causing charging of battery 408. Additionally, if battery 408 has a low state of charge, thermal control logic 400 may instruct battery charger 406 to top off the charge during the warming time instead of at a more gradual charging rate or at a later time. Similarly, thermal control logic 400 may instruct air compressor 404 to engage to top off its pressure tank. As indicated above, thermal control logic 400 may also cause operation of throttles 14, 98 and air-compressor 16, in addition to manipulation of the air-fuel mixture to achieve a desired air-fuel mixture to increase the temperature of the liquid. Additionally, thermal control logic 400 may increase the backpressure to cause the DP/P ratio to rise above its normal maximum level, where DP is the difference between the intake and exhaust manifold pressures, and D is the intake manifold pressure. In some engines, the normal DP/P range is between 0.01 and 0.7, and the backpressure is increased such that the DP/P ratio exceeds 0.9. In other engines the normal DP/P is lower, perhaps even negative.

Figure 5:
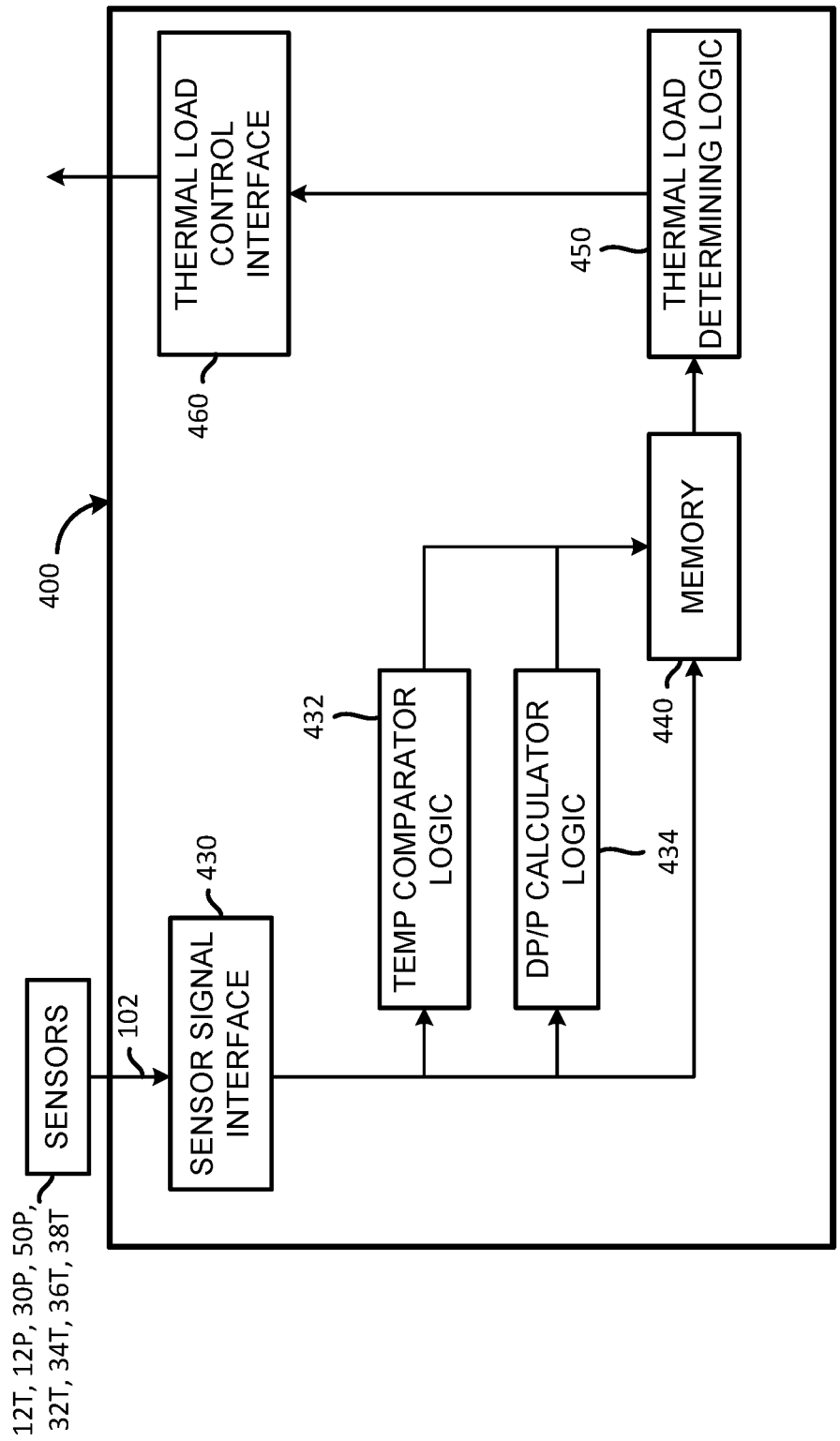
FIG. 5 is a block diagram of a controller including thermal control logic structured to implement the method depicted in FIG. 3 to implement the thermal control curves depicted in FIG. 2.

Referring now to FIG. 5, thermal control logic 400 may be implemented in a number of ways. In one example, sensor signal interface 430 comprises logic structured to digitize, calibrate, stabilize and/or filter the incoming sensor signals (in the case of incoming analog signals) or to store the sensor signals (in the case of digital signals received via a CAN bus). Data corresponding to the signals is stored in memory 440, accessible by temperature comparator logic 432 and DP/P calculator logic 434, whose function is to compare the sensor temperatures and pressures to respective thresholds (also stored in memory) or calculate the DP/P ratio based on the sensor data and store the results as operating conditions (also stored in memory). Operating conditions may also include the state of charge of battery 408 and pressure of air compressor 404, among other operating variables. Based thereon, thermal load determining logic 450 implements rules to add/remove thermal loads and outputs instructions via thermal load control interface 460. In one example, thermal load control interface 460 comprises a CAN module coupled to the CAN bus and configured to communicate with the various thermal loads or controller 110 to cause controller 110 to, for example, change the air/fuel ratio, increase the idle speed of the engine, open/close the gate of the turbocharger to increase backpressure, or engage the after-treatment system to reduce the DP/P ratio. Thermal load determining logic 450 may include or access memory tables comprising data representative of the thermal energy obtainable by engaging the foregoing warming actions, and may include logic to determine which action to engage responsive to the difference between a sensed temperature and a threshold, as described with reference to FIG. 2, so as to not apply too large or too small of an engagement. Thermal load determining logic 450 may generate the instructions based on the temperature of the liquid, the amount of energy required to raise the temperature of the liquid, and the amount of energy that can be provided by increasing the pumping load or engaging parasitic loads or changing the air/fuel mixture. These values can be determined empirically or based on known thermodynamic models of the engine. The instructions can also account for the rate of change of the temperature to apply a derivative factor to the calculations, thus preventing over or undershooting the normal temperature range.

Thermal control logic 400 may, additionally, obtain information from other modules, such as a DP/P determining module (in which case DP/P calculator logic 434 is omitted from thermal control logic 400), a battery module providing state-of-charge information, a compressor control module providing pressure information, an after-treatment system pressure module sensing a differential pressure indicative of hydrocarbon loading, an exhaust temperature sensing module, and a fueling module providing information representative of the air/fuel mixture and, in one example, receiving instructions in respect to an air/fuel mixture change. Thermal control logic 400 may instruct the fueling module to thin the mixture, may instruct a turbocharger module to over-close or open a gate of the turbocharger to increase the pumping load, and may output control signals directed to parasitic loads to engage or disengage additional parasitic loads.

One of skill in the art, having the benefit of the disclosures herein, will recognize that the control subsystem 100 and the controller 110 are structured to perform operations that improve various technologies and provide improvements in various technological fields. Without limitation, example and non-limiting technology improvements include improvements in combustion performance of internal combustion engines, improvements in emissions performance, after-treatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, after-treatment systems therefore, air handling devices therefore, and intake and exhaust devices therefore.

While this specification contains specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples). Thus, particular implementations of the invention have been described. Other implementations are within the scope of the following claims. In some cases, actions recited in the claims may be performed in a different order and still achieve desirable results. In addition, the depictions in the accompanying figures do not necessarily require a particular order or sequential order.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method of controlling operation of an internal combustion engine, the method comprising:
    determining a temperature of a working liquid in an engine block circuit of the internal combustion engine, the working liquid comprising a cooling liquid or a lubrication liquid;
    operating the internal combustion engine;
    engaging a thermal load responsive to the temperature of the liquid being below a first temperature threshold, wherein engaging the thermal load comprises at least one of increasing a pumping load of the internal combustion engine, or changing an air/fuel ratio, thereby adding heat to the engine block circuit;
    controlling the thermal load as a function of the temperature of the liquid; and
    disengaging at least a portion of the thermal load responsive to the temperature of the liquid being above the low temperature limit;
    wherein increasing the pumping load comprises adjusting a variable geometry turbocharger to increase backpressure; and
    wherein increasing the pumping load comprises controlling a backpressure of the internal combustion engine as a function of a DP/P ratio, wherein DP comprises a difference between an exhaust manifold pressure and an intake manifold pressure, and wherein P comprises the intake manifold pressure.

2. The method of claim 1, wherein increasing the pumping load further comprises engaging a parasitic load.

3. The method of claim 2, wherein the parasitic load comprises at least one of an air compressor, a battery charger, or a resistive heater.

4. The method of claim 3, wherein the resistive heater comprises a resistive exhaust system heater to increase a temperature of exhaust gases.

5. The method of claim 3, wherein the resistive heater comprises a resistive liquid circuit heater.

6. The method of claim 1, wherein increasing the pumping load further comprises increasing an idle speed of the internal combustion engine.

7. The method of claim 1 wherein controlling the back pressure comprises at least one of over-closing a gate of a turbocharger or maintaining an exhaust valve closed for a longer period of time than when the thermal load is not engaged.

8. The method of claim 1, wherein disengaging at least a portion of the thermal load comprises removing a first portion of the thermal load responsive to the temperature of the liquid rising above the first temperature threshold and removing a second portion of the thermal load responsive to the fluid temperature rising above a second temperature threshold higher than the first temperature threshold.

9. The method of claim 1, wherein engaging the thermal load further comprises desorbing hydrocarbons from an exhaust after-treatment system of the internal combustion engine prior to the exhaust after-treatment system reaching a differential pressure ratio threshold configured to trigger desorbing.

10. A controller comprising thermal control logic structured to implement the method of claim 1.

11. An internal combustion engine comprising:
    an engine block including an engine block circuit to circulate a liquid therethrough, the engine block circuit comprising a cooling circuit or a lubrication circuit;
    a temperature sensor structured to sense a temperature of the liquid; and
    an engine controller comprising thermal control logic structured to implement a method including:
        operating the internal combustion engine;
        engaging a thermal load responsive to the temperature of the liquid being below a first temperature threshold, wherein engaging the thermal load comprises at least one of increasing a pumping load of the internal combustion engine or changing an air/fuel ratio, thereby adding heat to the engine block circuit;
        controlling the thermal load as a function of the temperature of the liquid; and
        disengaging at least a portion of the thermal load responsive to the temperature of the liquid being above the low temperature limit;
        wherein increasing the pumping load comprises adjusting a variable geometry turbocharger to increase backpressure;
        wherein increasing the pumping load comprises controlling a backpressure of the internal combustion engine as a function of a DP/P ratio, wherein DP comprises a difference between an exhaust manifold pressure and an intake manifold pressure, and
    wherein P comprises the intake manifold pressure.

12. The internal combustion engine of claim 11, further comprising an exhaust manifold pressure sensor to sense the exhaust manifold pressure and an intake manifold pressure sensor to sense the intake manifold pressure.

13. The internal combustion engine of claim 11, wherein increasing the pumping load further comprises engaging a parasitic load.

14. The internal combustion engine of claim 13, wherein the parasitic load comprises at least one of an air compressor, a battery charger, or a resistive heater.

15. The internal combustion engine of claim 11, further comprising a resistive heater thermally coupled to the engine block, wherein increasing the pumping load comprises engaging the resistive heater.

16. The internal combustion engine of claim 11, wherein increasing the pumping load further comprises increasing an idle speed of the internal combustion engine.

17. The internal combustion engine of claim 12 further comprising a variable-gate turbocharger, wherein controlling the back pressure comprises over-closing a variable gate of a turbocharger.

18. The internal combustion engine of claim 11, wherein disengaging at least a portion of the thermal load comprises removing a first portion of the thermal load responsive to the temperature of the liquid rising above the first temperature threshold and removing a second portion of the thermal load responsive to the fluid temperature rising above a second temperature threshold higher than the first temperature threshold.

19. The internal combustion engine of claim 11, wherein engaging the thermal load further comprises desorbing hydrocarbons from an exhaust after-treatment system coupled to the internal combustion engine prior to the exhaust after-treatment system reaching a differential pressure ratio threshold configured to trigger desorbing.

* * * * *